United States Patent [19]

Hard et al.

[11] 4,359,449

[45] Nov. 16, 1982

[54] PROCESS FOR MAKING TITANIUM OXIDE FROM TITANIUM ORE

[75] Inventors: Robert A. Hard, Laguna Beach; Martin A. Prieto, Diamond Bar, both of Calif.

[73] Assignee: Occidental Research Corporation, Irvine, Calif.

[21] Appl. No.: 216,056

[22] Filed: Dec. 15, 1980

[51] Int. Cl.³ .......................................... C01G 23/047
[52] U.S. Cl. ........................................ 423/82; 423/84; 423/610; 423/611; 423/85
[58] Field of Search .................... 75/84.4, 84.5, 1 T; 423/492, 82, 83, 84, 86, 610, 611, 85

[56] References Cited

U.S. PATENT DOCUMENTS

| | | | |
|---|---|---|---|
| 2,837,426 | 6/1958 | Kamlet | 75/84.5 |
| 2,857,265 | 10/1958 | Schossberger | 75/84.5 |
| 3,012,878 | 12/1961 | Muller | 75/84.5 |
| 3,669,648 | 6/1972 | Homma | 75/84.5 |
| 3,903,239 | 9/1975 | Berkovich | 423/610 |
| 3,925,531 | 12/1975 | Moss | 423/610 |
| 3,929,962 | 12/1975 | Shiah | 423/83 |
| 4,058,393 | 11/1977 | McLaughlin | 75/1 T |
| 4,107,264 | 8/1978 | Nagasubramanian | 423/83 |
| 4,119,697 | 10/1978 | Tolley | 423/82 |
| 4,127,409 | 11/1978 | Megy | 75/84.4 |
| 4,168,297 | 9/1979 | Nagasubramanian | 423/70 |
| 4,178,176 | 12/1979 | Tolley | 423/86 |
| 4,199,552 | 4/1980 | Rado | 423/83 |

Primary Examiner—M. J. Andrews
Assistant Examiner—J. J. Zimmerman
Attorney, Agent, or Firm—Robert J. Baran

[57] ABSTRACT

The instant invention relates to a process for the preparation of titanium dioxide from an ore comprising titanium oxides which comprises the steps of fluorinating said ore to convert the titanium oxides to titanium fluorides; and, contacting said titanium fluorides with an alkaline material at conditions whereby said titanium fluorides are converted to titanium dioxide. The ore may be an ilmenite ore and the fluorination may be carried out by contacting said ilmenite ore with a fluosilicate salt as sodium fluosilicate.

7 Claims, 1 Drawing Figure

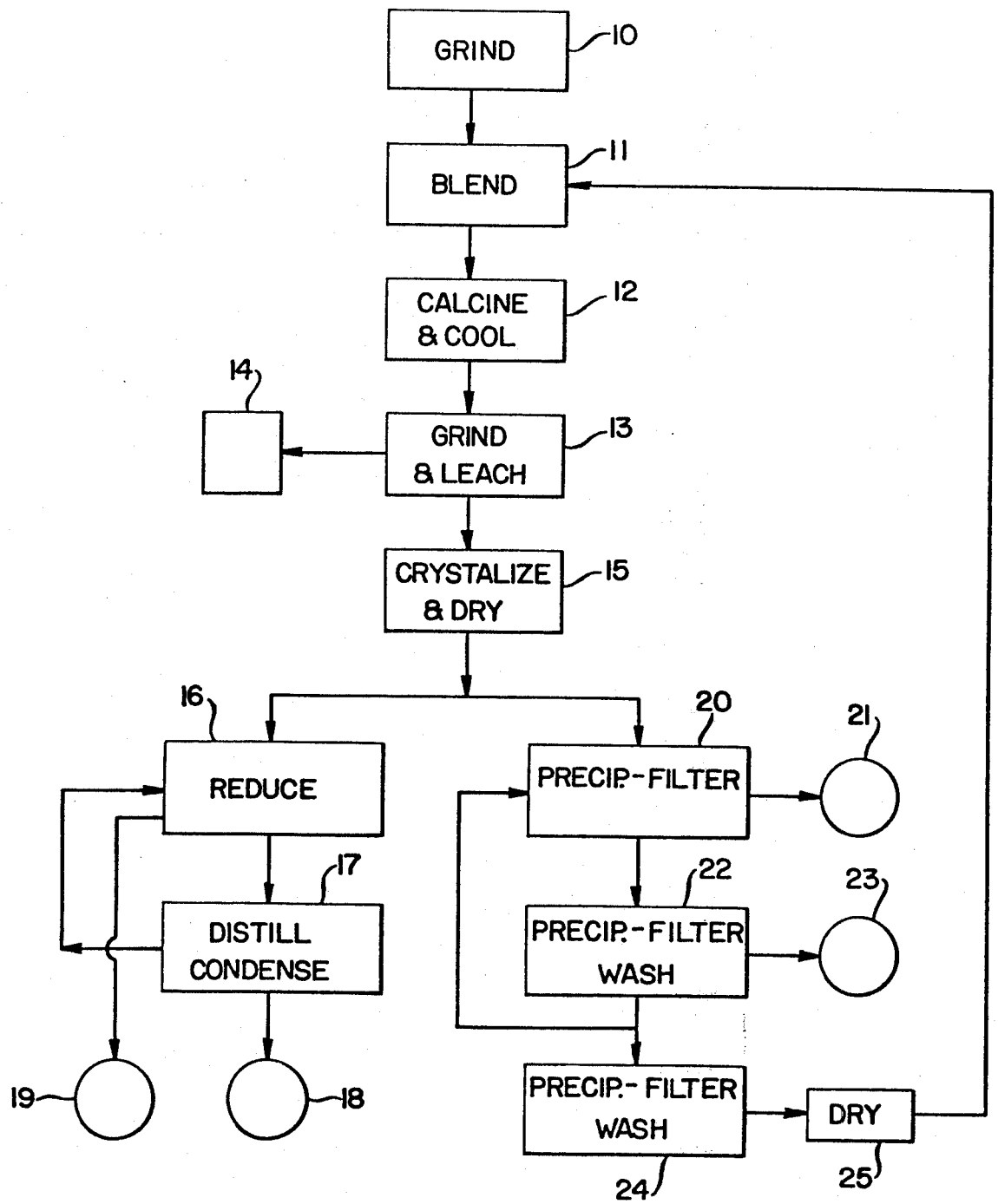

PROCESS FOR MAKING TITANIUM OXIDE FROM TITANIUM ORE

FIELD OF THE INVENTION

The instant invention relates to a process for the preparation of titanium dioxide from an ore comprising titanium oxides which comprises the steps of fluorinating said ore to convert the titanium oxides to titanium fluorides; and, contacting said titanium fluorides with an alkaline material at conditions whereby said titanium fluorides are converted to titanium dioxide. The ore may be an ilmenite ore and the fluorination may be carried out by contacting said ilmenite ore with a fluosilicate salt as sodium fluosilicate.

CROSS REFERENCE TO RELATED PATENT APPLICATIONS

This patent application is related to U.S. Ser. No.'s 216,057 and 216,058 which are entitled "Process for Making Titanium Metal from Titanium Ore", both of which were filed on the same date herewith in the names of M. Prieto and R. Hard; and J. Megy, respectively.

BACKGROUND OF THE PRIOR ART

Titanium metal has been essential to the aerospace industry since the early fifties because it combines a high strength to weight ratio with the ability to perform at much higher temperatures than aluminum or magnesium. It also has growing usage in the chemical processing industries because of its excellent resistance to chloride corrosion. Recently the world demand for titanium has outstripped the limited production facilities causing it to be put on allocation in the United States.

Most of the United States primary titanium is imported from Japan and Europe. A majority of titanium is made by the "Kroll Process" which involves magnesium reduction of titanium tetrachloride, which is in turn made from rutile ($TiO_2$). Titanium metal is also made by Na reduction and electrowinning. The product of the "Kroll Process" is a metallic sponge which is later consolidated by a high temperature arc melting process. The most important consideration for any process making titanium is to prevent contamination with either metallic or non-metallic impurities, because even small amounts of oxygen or nitrogen can make the product brittle and unworkable, although carefully controlled amounts of oxygen, nitrogen, and carbon may be added to strengthen titanium alloys.

U.S. Pat. No. 2,550,447 teaches a process for preparing titanium metal from titanium oxide ores such as rutile, anatase and ilmenite which comprises reduction of the ore by aluminum followed by iodination of the product obtained from such reduction. The iodinated product is then reacted with potassium iodide. Finally, titanium tetraiodide is removed from the potassium iodide and converted to titanium metal by either heat decomposition or reduction. This process is a very expensive method for making titanium metal.

U.S. Pat. No. 2,781,261 discloses a process for converting titanium dioxide to titanium by fluorinating titanium oxide, neutralizing the fluotitanic acid obtained, and reducing the neutralized fluotitanic acid with aluminum.

U.S. Pat. No. 2,837,426 teaches a process for converting ilmenite to an alkali metal fluotitanate by reacting ilmenite with sulfuric acid to form the titanium sulfate, removing a portion of the iron included with said titanium sulfate by reduction and precipitation of a reduced iron compound, and finally converting the titanic sulfate filtrate to an insoluble fluotitanate by means of an ammonium and/or alkali metal fluoride solution.

U.S. Pat. No. 2,857,264 teaches a process for preparing an alkali metal chlorotitanate by digesting ilmenite in a mixture of sulfuric and hydrochloric acid. Again, the iron present is precipitated out as ferrous sulfate and then further recovered by the addition of HCl to precipitate a ferrous chloride. Finally, potassium chloride is added to salt out potassium chlorotitanate which may be reduced with a Group I metal to titanium.

U.S. Pat. No. 3,012,878 teaches a process for reducing titanium halides to titanium metal by use of sodium metal.

U.S. Pat. No. 3,825,415 teaches a process, similar to the process disclosed in U.S. Pat. No. 3,012,878, except that the process is carried out in the vapor phase.

U.S. Pat. Nos. 4,127,409 and 4,072,506 are related to the recovery of zirconium and hafnium, respectively, by the reduction of the corresponding potassium chlorozirconates or hafniates by means of an alloy of aluminum and zinc.

SUMMARY OF THE INVENTION

The instant invention relates to a process for the preparation of titanium oxide from ores containing oxides of titanium by fluorinating said ore to convert the oxides of titanium to fluorides of titanium and then hydrolyzing said fluorides of titanium with a base to yield a titanium hydroxide. In a preferred embodiment of the instant invention the ore is ilmenite which is a ferric titanate, i.e. ilmenite contains both iron and titanium in the oxide form. The fluorination is preferably carried out by contacting the ore with a fluosilicate salt such as an alkali metal fluosilicate, for example, $K_2SiF_6$, $Na_2SiF_6$, etc. at a temperature from about 600° C. to 1000° C. preferably 750° C. to 950° C. The iron and titanium are converted to fluorides which may be leached from the fluorinated ore by an aqueous solution. The aqueous solution may contain a strong acid (a mineral acid) to enhance the recovery of soluble titanium. The leaching solution may be treated to oxidize the iron dissolved therein to the ferric state and precipitate out the hydrolysis product thereof as ferric hydroxide. The ferric hydroxide may be separated from the solution by filtration and filtrate utilized to recover soluble titanium. If an aqueous acid leaching solution is used, the iron may remain in the leaching solution after the fluorides of titanium are removed as shown below.

If the preferred fluosilicate is utilized as the fluorinating agent for the ore, the corresponding fluotitanate is the soluble titanium moiety. For example when potassium fluosilicate is utilized as the fluorinating agent a potassium fluotitanate salt will be dissolved in the leaching solution. The leaching solution will also contain various other soluble fluorides such as for example potassium fluoride. The solution may be evaporated and cooled to precipitate out the fluotitanate, for example, the potassium fluotitanate.

The fluotitanate precipitate may then be filtered and dried at a temperature of from about 110° C. to 150° C. and subsequently hydrolyzed to titanium oxide.

The fluotitanate may alternatively be recrystallized from an aqueous solution and such recrystallized fluotitanate converted to titanium oxide by contacting salt with an aqueous basic solution to thereby hydrolyze the titanium to the titanium tetrahydroxide. The titanium tetrahydroxide may then be precipitated from the solution in the form of titanium oxide including two waters of crystallization. The hydrolysis of said fluotitanate salt may be effected in a solution having a pH of at least about 5.0, and preferably from at least about 5.5, at a temperature of at least about 20° C.

DETAILED DESCRIPTION OF THE INVENTION

Ilmenite which is an ore comprising titanium and iron oxides in admixture is available from various locations such as southern Georgia, northern Florida, and California. The ore will typically comprise from 25 to 50% by weight, titanium and from 8 to 36% by weight, iron. A suitable ilmenite ore may be ground to a finely divided physical state to make it more susceptible to fluorination. For example, the ore may be ground to a particle size of from 30 to 400 mesh and preferably from 100 to 400 mesh. The ore may be fluorinated by fluorination agents known in the art such as $F_2$, HF, $SiF_4$, $NH_4F$, $NH_4HF_2$, etc. However, in a most preferred embodiment of the instant invention, the fluorinating agent will be a fluosilicate salt. This material is especially suitable because the more active fluorinating agents tend to attack the various equipment suitable for carrying out the fluorinating process.

The fluosilicate salt is a solid at the suitable fluorinating temperatures and therefore such fluorination may occur as a solid state reaction between the ore and the fluosilicate. Typical fluosilicates include potassium and sodium salts. Sodium fluosilicates, for example, may be blended with the ore at a weight ratio of from 0.5 to 5.0 and preferably from 1.0 to 2.5 to effect adequate fluorination. Other titanium-containing ores such as rutile and anatase, i.e. titanium oxides, may also be utilized in this process, however, ilmenite is preferred and therefore utilized herein for description of the invention.

The fluorination will be carried out at conditions which are sufficient to convert both the titanium and the iron in the ore into the respective fluoride derivatives; that is, fluorides of titanium and iron, respectively. For example, if sodium fluosilicate is utilized as a fluorinating agent, the mixture of the fluosilicate and the ore will be heated to a temperature of at least 600° C. preferably from 750° to 950° C. for a time sufficient to change the iron and titanium from oxides to the fluorides. At higher temperatures the reactant mass may fuse and become difficult to remove from the reaction chamber; at lower temperatures the reaction does not progress at a suitable rate.

It has been unexpectedly found that the presence of iron acts to enhance the fluorination reaction of the fluosilicates noted above, and as will be further elucidated below an increased recovery of soluble titanium is thus obtained. The ilmenite ores which are low in iron content may benefit from the addition of additional iron, for example, in the form of ferric oxide. Other titanium ores such as rutile and anatase, which are subsequently iron-free, have been found to be benefited greatly by the addition of iron. Furthermore, it is found that the ilmenite ores having at least from 14 to 36% iron are very easily fluorinated by the above fluosilicates and may not require additional ferric oxide. For the purpose of this specification, the term "substantially iron free" shall means less than about 14%, by weight, iron.

It has been found that the addition of carbon in conjunction with either the iron present in the ilmenite ore or iron, e.g., ferric oxide, which is added to the lower iron-containing ilmenites, or rutile or anatase has a synergistic effect on the subsequent recovery of titanium. For example from 1 to 10, and preferably from 1.2 to 4 weight % carbon may be admixed with the above iron-containing titanium ore to enhance the recovery of titanium.

It has been found that when using the preferred alkali fluosilicates as fluorinating agents the fluorination reaction is benefited by being carried out under an atmosphere of a gaseous fluorinating agent such as silicon tetrafluoride. It is believed that the silicon tetrafluoride may be the active fluorinating agent obtained from the fluosilicate and thus acts to initiate and enhance the fluorination reaction of the ilmenite ore. Typically, the fluorination reaction may be carried out under a partial pressure of from 0.1 to 70 psig, preferably at least about 1 to about 70 psig, e.g. 30 psig of silicon tetrafluoride. The upper pressure limit will be dictated by the economics of carrying out high pressure reactions.

The fluorinated ore may be cooled and then ground prior to the recovery of the soluble titanium by leaching the ground mixture of the fluorinated ore and the residue of the fluorinating agent by contacting under agitation with the leaching solution. The iron which is present in the ore in the form of ferrous fluoride may be removed from the fluorinated ore by oxidation and hydrolysis of the oxidation product. For example, during leaching, the ground fluorinated ore may be heated in the presence of air to a temperature of from 50° to 95° C. in order to oxidize the ferrous fluoride to the ferric state. However, oxidation may take place during leaching as noted or can be carried out prior to leaching. Preferably, oxidation and leaching are carried out simultaneously so that the leaching solution assists by hydrolyzing the oxidized iron to an insoluble ferric hydroxide.

Leaching of the fluorinated ore may be carried out in an aqueous solution which may beneficially contain a strong acid such as hydrochloric or sulfuric acid. The pH of said leaching solution is preferably at least about 0.1, preferably from about 2.0 to about 5.0. When an aqueous acid leaching solution is utilized, the above described removal of iron may be eliminated and the iron can remain in solution after the separation of the fluorides of titanium as described below.

The leaching may take place at a temperature of at least 25° C., preferably from 60° C. to 95° C. The leaching is carried out for a time sufficient to recover as much of the soluble fluorides of titanium as economically possible. Typically, leaching is carried out for about 1 to 3 hours with the ratio of leaching solution to the fluorinated ore varying from 15:1 to 5:1, e.g., 10:1, on a volume to weight basis.

It has been found that the recovery of the fluorides of titanium is enhanced by leaching with an aqueous hydrogen fluoride solution. While there is no theoretical reason for this improvement, it has been found that solutions of from 1 to 10%, by weight, HF, extract the soluble fluorides of titanium, at a faster rate than the other leaching solutions including hydrochloric and sulfuric acid solutions. For example, the hydrogen fluoride solutions may extract up to 100% of the titanium originally present in the ore while corresponding solutions of HCl and sulfuric acid may obtain only 70% of such titanium over the same time period. Higher concentrations of HF are operable, but are more corrosive and require difficult handling procedures.

The leaching solution may be filtered to remove oxidized iron as the ferric hydroxide. The filtrate will comprise soluble fluorides of titanium, for example in the preferred embodiment $K_2TiF_6$ or $Na_2TiF_6$. In addition, various other soluble fluorides may be present in the filtrate such as the fluoride salt of the corresponding alkaline fluosilicate, such as sodium fluoride or potassium fluoride. It has been surprisingly found that it is easy to separate the fluorides of titanium from certain other soluble fluorides since solubility characteristics are such that the fluorides of titanium precipitate as the temperature of the solution is lowered while other fluorides such as sodium fluoride are more soluble in lower temperature solutions. Thus, the solution may be evaporated to concentrate soluble fluorides and then the temperature decreased until the fluorides of titanium crystallize. The crystals of the fluorides of titanium may be separated and dried at a temperature of from 50° to 150° C. to remove excess water.

If desirable, the fluorides of titanium may be crystallized from an acidic iron containing solution substantially without contamination thereof.

The dried crystals of the fluorides of titanium may be reduced in a reducing zone wherein they are preferably contacted in a molten state with a molten zinc-aluminum alloy. The alloy may comprises from 1:99 to 20:80 parts of Al to Zn. The molten salt and the alloy are mutually immiscible, and therefore agitation must be provided in such reducing zone to assure intimate contact. The reduction will take place at a temperature of at least 650° C. to 1000° C. preferably from 700° C. to 900° C. The time of contacting of said molten alloy and molten salt will be varied to assure that the titanium present in the salt is converted into a titanium-zinc alloy. The aluminum present in the aluminum-zinc alloy during the course of the reduction is converted into the corresponding fluoride and may be isolated, when sodium fluosilicate is used as the fluorinating agent, as the pseudo cryolite described above. After the agitation is ceased, the reduced mixture separates with the molten salt rising to the top wherein it may be decanted from such mixture. Alternatively, the molten titanium zinc alloy may be separated from the bottom of the vessel and passed to the reducing zone. Reduction must take place under inert conditions because of titanium metal's propensity to pick up oxygen and nitrogen. Suitably, an argon atmosphere is present during the reduction step. A suitable vessel for carrying out the aforementioned reduction, as well as any of the various high temperature operations described herein may be graphite.

It has been found that, during the reduction step, it is necessary that both the salt and alloy phase be maintained above the liquidous temperature to avoid solids formation which would be abrasive to both the agitator and the reactor.

It is desirable to have as much titanium reduced into the molten zinc alloy as possible to minimize the amount of zinc to be distilled in the subsequent distillation step. At atmospheric pressure, the titantium-zinc alloy boils at approximately 915° C. At that temperature only 15% titanium can be dissolved into the zinc before solids begin forming. However, if the reactor is placed under elevated pressure (about 1.5 atmospheres), then the molten zinc-alloy boils at 950° C. and approximately 25% titanium can be dissolved in zinc before the onset of solids formation.

To allow margin of safety, the reactor may be operated at 2 atmospheres which will allow a temperature of slightly over 1000° C. before the mixture boils and 25% by weight of titanium can be dissolved in the solution without solids formation. This results in a significant reduction in the amount of zinc to be distilled from the titanium in the subsequent step. It should be noted that if the pressure is increased still more in the hope of further increasing the titanium solubility two problems occur.

The first problem is the solubility does not increase rapidly with temperatures beyond 950° C. and secondly, there is a substantial increase in contamination by carbon from the reactor wall. The degree of carbon contamination is severe above 1100° C.

Other methods of reducing the fluorides of titanium to the metal are known in the art and although, less preferred, may be utilized in place of the zinc-aluminum alloy. Examples of other methods of reducing the fluorides of titanium to titanium metal ore described above under Background of the Prior Art and are hereby incorporated by reference for that purpose.

The argon atmosphere or other inert atmosphere may be also utilized during the subsequent separation of the titanium from the titanium-zinc alloy. The molten titanium-zinc alloy will be passed to a distillation zone wherein the zinc may be distilled off at a temperature of from about 800° C. to 1000° C. to leave behind a titanium sponge. Alternatively the zinc may be distilled from the zinc-titanium alloy under a vacuum and at somewhat lower temperatures.

The titanium sponge may be sintered to reduce its surface area. After sintering and cooling the sponge is passified by exposure to dilute $O_2$ to give a thin (mono-molecular) protective coating of titanium oxide thereon before the sponge is exposed to a non-inert atmosphere. The zinc will be recovered and recycled for use in subsequent reducing steps.

As an alternative, the fluorides of titanium may be hydrolyzed to titanium dioxide by contacting with a basic material. For example an aqueous solution comprising Group I or II (alkaline or alkaline earth) metal hydroxides, oxides or carbonates may be utilized to hydrolyze the fluorides of titanium to titanium hydroxide, provided such Group I or II metal does not form an insoluble product with any of the other components of the titanium material, e.g., the fluoride. Generally calcium containing bases can't be utilized because they form insoluble $CaF_2$. Such hydrolysis may be carried out at any convenient temperature, e.g. from 0° to 100° C., and the titanium oxide separated, as a precipitate, from the aqueous solution. In general, the fluorides of titanium will be separated from any iron, as described above, prior to hydrolysis to titanium oxide.

Methods for hydrolyzing halides of titanium, e.g. $TiI_4$ are known in the art and are suitable for converting the abovedescribed fluorides of titanium to titanium oxide. However, as described below, the hydrolysis of the preferred $K_2TiF_6$ and $Na_2TiF_6$ unexpectedly yields rutile rather than anatase.

The following is a preferred embodiment of the instant invention.

38,000 lbs. of ilmenite having a composition of 31.6% titanium and 35% iron is ground to a particle size of 100 mesh in grinding zone 10. The ground ilmenite is then blended with 70,735 lbs. of sodium fluosilicate in blending zone 11. The blended mixture is passed into calcining zone 12 wherein it is heated to a temperature of from 750° to 850° C., in the presence of one atmosphere of SiF₄, for a time of about 6 hours whereby the titanium oxides present in the ilmenite are converted to fluorides of titanium and the silicon fluorides present in the fluosilicate are converted to silicon dioxide. The titanium is converted to a product having the general formula Na₂TiF₆ in accordance with the following reaction.

$$Na_2SiF_6 + \tfrac{3}{2}FeO\cdot TiO_2 \rightarrow \tfrac{3}{2}Na_2TiF_6 + \tfrac{3}{2}FeF_2 + \tfrac{2}{3}NaF + SiO_2$$

This reaction also shows that the iron present in the ilmenite is converted to ferrous fluoride. The fluorinated mixture is then ground in grinding zone 13 and leached with an aqueous hydrofluoric acid solution containing 2.5% by weight hydrofluoric acid at a ratio of 10 lbs. of solution/lb reactant. The leaching is carried out under oxidizing conditions, for example, air may be contacted with the mixture during leaching to assist in oxidizing the ferrous ions present in the leaching solution to ferric ions which precipitate from the leaching solution at a pH of about 7. The solution may be adjusted to that pH if necessary by addition of a suitable base, e.g. NaOH etc. During the leaching the silicon dioxide reaction product of the fluorination will also be precipitated. The separation of the iron and silicon dioxide are evident from the following equations which describe the leaching step.

$$FeF_2 + H_2O + \tfrac{1}{2}O_2 \rightarrow \tfrac{1}{2}Fe_2O_3 \downarrow + 2HF$$

$$Na_2TiF_6 + \tfrac{2}{3}NaF + SiO_2 \rightarrow Na_2TiF_6$$
$$(\text{solution}) + \tfrac{2}{3}Naf + SiO_2 \downarrow$$

The ferric oxide and insoluble SiO₂ is removed from said grinding and leaching zone and may be dried and recovered as a mixture of silicon dioxide and ferric oxide in zone 14. The solution after filtration of the ferric oxide is passed to a crystallizing and drying zone 15 wherein about 740,000 lbs. of water is removed by heat and/or vacuum and the dewatered solution is cooled to a temperature of about 4° C. to crystallize sodium fluotitanate. The crystallized fluotitanate is filtered and may then be passed into a reducing zone 16 wherein 46,906 lbs. of fluotitanate is contacted under an inert atmosphere at a temperature of about 805° C. with 45,688 lbs. of a 10/90, by weight, molten alloy of aluminum and zinc. The fluotitanate is added, with agitation to the molten alloy over a 2 hour time period, whereby the molten salt and molten alloy solution are intimately contacted, i.e. by forming a dispersion of the molten salt and the molten alloy. The reaction is instantaneous, therefore, after such 2 hour period of addition the titanium has been converted to a zinc titanium alloy and the aluminum has been converted to an aluminum fluoride. The titanium-zinc alloy is removed from the bottom of reducing zone 16 and passed into distillation zone 17 wherein zinc is distilled off at a temperature of at least 800° C. and at a vacuum of about 10-5 torr. The distilled zinc is recycled back to reduction zone 16 for subsequent reuse. Titanium metal is recovered from distillation zone 17 as a sponge 18. The molten salt mixture which is a mixture of sodium and aluminum fluoride, i.e. a pseudo cryolite, is recovered from the top of reduction zone 16 and sent to recovery zone (19).

Alternatively, the recrystallized sodium fluotitanate from zone 15 may be passed into a precipitation-filtration zone 20 wherein the solution is contacted with an aqueous sodium hydroxide solution to convert the soluble titanium to the titanium oxide form. The titanium oxide precipitates from the solution and is recovered in zone 21. Approximately 334 lbs. of NaOH per pound of soluble titanium is required to precipitate the titanium dioxide. The filtrate from zone 20 containing soluble fluorides is contacted with calcium oxide in precipitation-filtration zone 22 to precipitate calcium fluoride which may be recovered at zone 23. The sodium fluoride-containing solution from zone 22 may be passed into zone 24 wherein it may be contacted with a 23% solution of H₂SiF₆ to precipitate sodium fluosilicate which after drying in zone 25, may be recycled to zone 11 for further fluorination use.

The following are working examples illustrating the instant invention. There is no intention that the claims of this invention be bound to such working examples.

General Procedure for Fluorinating Ore Comprising Titanium Oxide and Recovering the Resulting Fluorides of Titanium Illmenite ore concentrates of about 100 mesh particle size are blended with sodium fluosilicate salt (and in certain examples powdered iron oxide and/or carbon) to form a homogeneous mixture. The proportions of the ingredients consist of 102 parts of ore, 244 parts of sodium fluosilicate, (54 parts of ferric oxide and 12 parts carbon). The mixture is compacted into pellets or briquets one inch in diameter by about one inch thick, and then heated in a furnace to temperatures ranging from 650° C. to 850° C. The specific temperature is maintained for an extended time interval usually from one to six hours. The material after cooling is removed from the furnace and ground to about 60 mesh particle size. The ground material is leached with water which may contain approximately 0.6 to 1.3 moles of a mineral acid preferably hydrochloric or hydrofluoric acid at 96° C. for two hours. The volume of the leaching solution employed is approximately ten times the weight of the ground material. After separation of solids the solution is heated until two-thirds of its volume is evaporated. When cooled to room temperature a crop of white crystals of sodium fluotitanate is obtained, separated and then dried at 110°–120° C. in a conventional oven.

The following examples lists the specific parameters for reaction of ilmenite ore and sodium fluosilicate and improvements derived by use of iron oxide and carbon for recovery of titanium from the ore.

EXAMPLE 1

102 parts of ilmenite ore concentrates with a nominal particle size of −100 mesh +200 mesh and containing 46.9 weight percent titanium and 14.5 wt.% Fe were mixed with 244.5 parts of sodium fluosilicate salt and formed into briquets or pellets. The briquets were heated in a furnace to 750° C. for six hours. After cooling the briquets were removed from the furnace and ground to about 60 mesh particle size. The ground mass is leached with a 5 volume percent mineral acid solution, preferably hydrochloric or hydrofluoric acid at 96° C. for two hours. The volume of acid solution was approximately ten times the weight of solid material employed. After separation of the ore gangue the solution contains the soluble titanium salts. 47.5 wt.% of the titanium contained in the ore concentrates was extracted.

EXAMPLE 2

102 parts of ilmenite ore concentrates with a nominal particle size of −100 +200 mesh containing 46.9 wt.% titanium and 14.5 wt.% iron were mixed with 244.5 parts of sodium fluosilicate salt and 12 parts of carbon powder. The admixture formed into briquets or pellets were heated (calcined) in a furnace to 750° C. for six hours. After cooling the briquets were crushed and ground to pass a 60 mesh sieve. The ground material was leached with a 5 volume percent mineral acid at 95° C. for two hours. After separation of the insoluble gangue material the solution containing the soluble titanium salts indicated that 85.9% of the titanium in the ore had been extracted. This represented an increase of 38.4% of extractable titanium due to use of carbon in the calcining step.

EXAMPLE 3

102 parts of ore concentrates with a nominal particle size of −100 +200 mesh containing 46.9 wt.% titanium and 14.5 wt.% iron were mixed with 244.5 parts of sodium fluosilicate, 12 parts of carbon powder, and 54 parts of ferric oxide powder. The admixture formed into briquets or pellets and heated (calcined) in a furnace to 750° C. for 6 hours. After cooling the briquets were crushed and ground to pass a 60 mesh sieve and then leached at 96° C. with 5 volume percent mineral acid (HF) solution for two hours. The solution after separation of the insoluble gangue materials contained soluble fluotitanate salts indicative of 89.2% of the titanium present in the ore. Hence the addition of iron oxide prior to calcining the admixture resulted in an additional improvement of extractable titanium of 3.3 wt.% over calcining the admixture which contained carbon.

EXAMPLE 4

Comparable improvements of extractable titanium were obtained by calcining the ore utilized above at temperatures of 850° C. as opposed to calcining at 650° C. and 750° C. These results are shown in the following Table 1:

TABLE 1

| Test No | Calcine Admixture Parts | | | | Calcine | | Percent Extractable Ti |
|---|---|---|---|---|---|---|---|
| | Ore | Na$_2$SiF$_6$ | Carbon | Fe$_2$O$_3$ | Temp. °C. | Time Hrs. | |
| TOC-13 | 102 | 214.5 | — | — | 650 | 6.0 | 17.1 |
| TOC-14 | 102 | 244.5 | 12.0 | — | 650 | 6.0 | 42.7 |
| TOC-20 | 102 | 244.5 | 12.0 | 54 | 650 | 6.0 | 58.9 |
| TOC-5 | 102 | 244.5 | — | — | 750 | 6.0 | 47.5 |
| TOC-10 | 102 | 244.5 | 12.0 | — | 750 | 6.0 | 85.9 |
| TOC-18 | 102 | 244.5 | 12.0 | 54 | 750 | 6.0 | 89.2 |
| TOC-7 | 102 | 244.5 | — | — | 850 | 6.0 | 68.4 |
| TOC-11 | 102 | 244.5 | 12.0 | — | 850 | 6.0 | 89.6 |
| TOC-19 | 102 | 244.5 | 12.0 | 54 | 850 | 6.0 | 98.4 |

These results clearly show that the addition of carbon and/or iron to ilmenite prior to fluorination results in a greater recovery of titanium. Note the ore utilized above has been defined as a substantially "iron free" ilmenite (less than about 14% by weight iron) for the purposes of this specification. However, in ilmenites comprising greater than 14%, by weight iron, carbon without the addition of additional iron, should provide adequate recovery of titanium after fluorination.

EXAMPLE 5

One hundred parts of ilmenite ore containing 26.4 wt.% titanium and 36 wt.% iron were mixed with 244.5 parts of sodium fluosilicate and the admixture formed into briquets or pellets. The briquets were heated to 750° C. for six hours in a furnace. After cooling the briquets were crushed and ground to pass a 60 mesh sieve and then leached with an aqueous solution of 5 volume percent mineral acid (HCl) at 96° C. for two hours. The volume of acid solution employed was ten times the weight of ground calcine. After separation of the insoluble ore gangue the amount of soluble titanium salts in the solution was indicative of 92.3 wt.% of the titanium in the ore. This compares to extractable titanium of 47.5% when ore containing only 14.5 wt.% iron had been employed, thus demonstrating the unexpected improvement found in adding iron to substantially iron-free ilmenite ores prior to fluorinating.

EXAMPLE 6

One hundred parts of ilmenite ore containing 26.4 wt.% titanium and 36.4 wt.% iron were admixed with 244.5 parts of sodium fluosilicate salt and 12 parts of carbon powder and formed into briquets. The briquets were calcined in a furnace at 750° C. for six hours. After cooling the briquets were cooled, pulverized and leached with a ten fold volume of 5 volume percent mineral acid at 96° C. for two hours. After separation of the insoluble gangue material the quantity of soluble titanium in solution represented 98.7% of the titanium in the ore. The use of carbon in the calcine admixture resulted in improving the extractable titanium by about 6.4% over 92.3 wt.% when no carbon was used. The following Table 2 of test results show that carbon improves recovery of titanium from ores containing high iron contents, i.e., the ore described in Example 6.

TABLE 2

| | Parts by Weight | | | Calcine | | Ti Recovery |
|---|---|---|---|---|---|---|
| Test No. | Ore | Na$_2$SiF$_6$ | Carbon | Temp. °C. | Time hrs. | % |
| TOC-21 | 100 | 244.5 | — | 750 | 6.0 | 92.3 |
| TOC-44 | 100 | 244.5 | 12.0 | 750 | 6.0 | 98.7 |
| TOC-24 | 100 | 244.5 | 12.0 | 650 | 6.0 | 42.7 |
| TOC-23 | 100 | 244.5 | — | 850 | 6.0 | 98.5 |

EXAMPLE 7

Reduction of the Recovered Sodiumfluotitanates and Recovery of Titanium 188 parts of sodium fluotitanate salts as obtained as previously indicated is placed in a graphite crucible along with a zinc-aluminum alloy consisting of 29 parts aluminum and 995 parts of zinc metal. [This represents a molar ratio of 4 to 3 aluminum to titanium in accordance with the reaction (see below)].

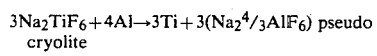

3Na$_2$TiF$_6$+4Al→3Ti+3(Na$^4$/$_3$AlF$_6$) pseudo cryolite

The crucible and contents are placed in an appropriate furnace and the furnace sealed. A purge of argon gas is used to remove air from furnace and provide an inert gas at atmosphere. The mixture is heated to about 500° C. then a graphite stirrer is inserted into the molten mixture. Heating is continued along with stirring of the mixture until the temperature reaches about 620° C. The temperature is maintained at 620° C. for about one hour to ensure complete reaction of the sodium fluotitanate and aluminum metal. The furnace power is turned off and allowed to cool to room temperature and the fused reaction mass removed. The salt portion at the top and the bottom melt portion containing elemental titanium are separated. The titanium metal containing alloy is then placed in a zinc distillation unit and the zinc distilled off at 910° C., in the presence of Argon, to leave a residue of titanium metal.

The following Table 3 shows the conversion of titanium from the salt, $Na_2TiF_6$, to the zinc-titanium metal.

TABLE 3

| Test No. | Parts $Na_2TiF_6$ | Al | Zinc | Temp. °C. | Time Hrs. | Conversion % |
|---|---|---|---|---|---|---|
| TRX-1 | 188 | 29 | 995 | 620 | 1.0 | 100 |

EXAMPLE 8

Reduction of Fluotitanate under Pressure

A 78 lb charge of zinc, 16.5 lbs aluminum, and 100 lbs of sodium fluotitanate are placed in a graphite reactor maintained under 2 atmospheres of argon pressure. The reactor is then heated to 960° C. and all ingredients are allowed to melt. A graphite agitator is then lowered into the melt rotated sufficiently rapidly to disperse the salt phase into the molten alloy phase for 30 minutes. After stirring the metal, the agitator is raised and salt and alloy are poured separately into the cast iron molds still under 2 atmospheres argon pressure. The yield is a metal casting of 78 lbs of zinc, 21 lbs. titanium and 0.005 lb. aluminum. The salt phase contains 2 lbs. titanium, 16.5 lbs aluminum, 22 lbs sodium and 55 lbs. fluorine.

The salt product from the reaction can be further processed with additional aluminum zinc alloy to remove the residual titanium and yield a salt suitable as an ingredient in aluminum electrowinning cells.

The alloy is processed by either vacuum distillation or distilled with a carrier gas to remove zinc and to sinter the titanium into a titanium sponge product.

EXAMPLE 9

| | COMPOSITION OF VARIOUS ILMENITES | | |
|---|---|---|---|
| Element | Georgia wt. % | California wt. % | Canadian wt. % |
| Ti | 46.9 | 41.8 | 26.4 |
| Fe | 14.5 | 18.6 | 36 |
| Si | 4.7 | 6.0 | 1.7 |
| Zr | 2.9 | 1.4 | Nil |
| Al | 1.2 | 1.3 | 1.2 |
| Mg | 0.29 | 0.48 | 3.8 |
| Mu | 1.3 | 2.5 | 0.19 |
| V | 0.13 | 0.13 | 0.036 |
| Fe/Ti | 0.31 | 0.44 | 1.36 |

The results obtained from the various ores, when fluorinated in accordance with the above General Procedures, after leaching with dilute HF (5 volume percent), are given in Table 5 below:

TABLE 5

| Ore | Titanium % Recovery | | | | |
|---|---|---|---|---|---|
| | 650° C. | 750° C. | 800° C. | 850° C. | 950° C. |
| Georgia | — | 50 | — | 83 | 95 |
| California | 41 | 82 | 90 | 90 | — |

TABLE 5-continued

| Ore | Titanium % Recovery | | | | |
|---|---|---|---|---|---|
| | 650° C. | 750° C. | 800° C. | 850° C. | 950° C. |
| Canada | 33 | 100 | — | — | — |

The results again demonstrate the importance of iron for the fluorination reaction. The high iron-containing ore (Canada) shows substantially 100% recovery of titanium at 750° C., while the lower iron-containing ores only approach 100% recovery at a temperature of at least 900° C.

EXAMPLE 10

Improving the Purity of Sodium Fluotitanate

To make an acceptably pure titanium metal, the starting materials must be correspondingly free of impurities, particularly phosphorus, iron and silicon. Of these three elements, the most difficult one to control when separating the preferred sodium fluotitanate is the silicon. The reason for this is that one of the products of the reaction is $SiO_2$ which can redissolve in acid solution containing fluoride ion as follows:

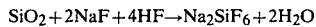

$$SiO_2 + 2NaF + 4HF \rightarrow Na_2SiF_6 + 2H_2O$$

Since the $Na_2SiF_6$ has limited solubility it will drop out with the titanium salt $Na_2TiF_6$ during crystallization. This is shown in Table 6 below, which gives the silicon and iron content of 5 crystallization experiments.

TABLE 6

| | COMPOSITION OF SALTS OF 1ST CRYSTALLIZATION ACID LEACHATE | | | | |
|---|---|---|---|---|---|
| | wt. % | | | XRD | |
| Sample No. | Ti | Fe | Si | Major Ti Salt | wt. % |
| TOC-5-2AX | 4.72 | 0.01 | 31.0 | $Na_2TiF_6$ | 20.5 |
| TOC-7 | 22.1 | 0.02 | 2.3 | $Na_2TiF_6$ | 95.9 |
| TOC-21-2AX | 22.3 | 1.76 | 1.82 | $Na_2TiF_6$ | 96.8 |
| TOC-23-2AX | 23.3 | 4.22 | 1.91 | $Na_2TiF_6$ $Na_5Ti_3F_{14}$ | 87.4 |
| TOC-34-2AX | 21.1 | 1.44 | 8.08 | $Na_2TiF_6$ | 91.6 |

To determine whether or not it is possible to separate the silicofluorides from the titanofluorides a composite was made of the above crystals and redissolved in water. Crystallizations made from these solutions give the results shown in Table 7 below. Obviously, there has been considerable improvement in purity especially relative to silicon.

TABLE 7

| | COMPOSITION OF RECRYSTALLIZED SODIUM FLUOTITANATE | | | |
|---|---|---|---|---|
| | Ti | Fe | Si | % $Na_2TiF_6$ |
| Starting Composition | 18.7 | 1.44 | 8.90 | 78.44 |
| 2nd Crystallization | 21.2 | 0.04 | 2.4 | 92.0 |
| 3rd Crystallization | 22.2 | 0.04 | 5.4 | 94.4 |
| Recrystallization from Mother Liquor | 22.1 | 0.2 | 0.6 | 95.9 |
| | 22.9 | 0.6 | 0.3 | 99.4 |

EXAMPLE 11

Effect of $SiF_4$ Gas Pressure on Recovery by Water Leach from Ilmenite Ores 100 parts of ilmenite ore containing 26.4 percent titanium and 36 percent iron ground to pass a 100 mesh sieve were mixed with 244.5 parts of sodium fluosilicate salts and then formed into compact briquets or pellets. The pellets were heated in a closed evacuated furnace to a temperature of 750° C. for six hours. The pressure of the furnace increased to a maximum of 28 inches of mercury total pressure during calcination. After cooling the briquets were removed, crushed and ground to pass a 60 mesh sieve and then leached three successive times at 95° C. for several hours with 10 fold weight of water. The quantity of titanium extracted by the water leaches represented 52.2% of the titanium present in the ore.

100 parts of ilmenite ore approximately 100 mesh particle size containing 26.4 percent titanium and 36 percent iron were mixed with 244.5 parts of sodium fluosilicate salts and formed into compacts of briquets or pellets. The briquets were heated in a closed, evacuated furnace to a temperature of 750° C. Silicon tetrafluoride gas was then admitted to the furnace until a pressure of 90 min. of Hg (approximately 30 psig) was attained. The briquets were maintained at 750° C. and under 30 psig $SiF_4$ pressure for six hours. After cooling and removal of the residual silicon tetrafluoride gas the briquets were crushed and ground to pass a 60 mesh sieve. The ground material was leached 3 successive times with 10 fold weights of water at 95° C. for two hour periods each. The amount of titanium extracted by the water leaches, representing 61.2 percent of the titanium present in the ore. The increase in silicon tetrafluoride gas pressure was responsible for a nine percent increase in titanium recovery.

TABLE 8

| Test No. | Parts Ore | Parts $Na_2SiF_6$ | Temp. °C. | Time hrs. | $SiF_4$ Pressure mm Hg. | % Titanium Extracted |
|---|---|---|---|---|---|---|
| TOC-21 | 100 | 244.5 | 750 | 6.0 | 28 | 52.2 |
| TOC-34 | 100 | 244.5 | 750 | 6.0 | 90 | 61.2 |

EXAMPLE 12

Preparation of Rutile $TiO_2$ by Hydrolysis of Sodium Fluotitanate Solution 104 parts sodium fluotitanate salts dissolved in 2 liters of water were added slowly to a one liter solution of sodium hydroxide containing 160 parts NaOH heated to 95° C. over a period of one hour. The resulting solids were separated from the solution and washed with additional water to remove residual sodium fluoride salts. The solids after drying in a conventional oven at 110° to 120° C. were repulped in one liter of a 5 volume percent hydrochloric acid solution at 90° C. for one-half hour. The solids were separated by filtration, washed with 200 ml. of water, then dried in an oven at 110° C. for several hours.

Analysis of the solids showed the solids to be titanium dioxide of the rutile crystal modification and containing less than 0.2 percent sodium or fluorine.

TABLE 8

| Test No. | Parts $Na_2TiF_6$ | NaOH | $H_2O$ | Temp. °C. | Time hrs. | °C. Dried |
|---|---|---|---|---|---|---|
| THX-1 | 104 | 160 | 4000 | 95 | 1.0 | 100–120° |
| Repulped with: Parts: | | | | | | |
| 5° HCl Solution: 1000 for ½ hour. Dried at 110°–120° C. for 2 hours. | | | | | | |

TABLE 9

| Composition of Solids Weight % | | | |
|---|---|---|---|
| Ti | Na | F | X-ray Diffraction |
| 53.0 | 0.12 | >0.1 | Rutile modification $TiO_2$ |

We claim:
1. A process for the preparation of titanium dioxide from an alkalimetal fluotitanate selected from the group consisting of $K_2TiF_6$ and $Na_2TiF_6$ which comprises the steps of:
    (a) contacting an aqueous solution comprising said alkalimetal fluotitanate with an aqueous solution comprising an alkaline material selected from the group consisting of alkaline and alkaline earth metal hydroxides, oxides or carbonates, which do not form insoluble fluoride salts at conditions whereby said alkalimetal fluotitanate is converted to titanium dioxide in the resulting solution, and (b) separating said titanium dioxide from said resulting solution as the rutile crystal modification.
2. The process of claim 1 wherein said alkalimetal fluotitanate is prepared by fluorinating an ore comprising ilmenite.
3. The process of claim 2 wherein fluorinating comprises contacting said ilmenite ore with alkali metal fluosilicate at a temperature of from about 600° C. to about 1000° C.
4. The process of claim 3 wherein said alkali metal is sodium.
5. The process of claim 4 wherein said alkaline material is sodium hydroxide.
6. The process of claim 5 further comprising the step of (c) drying said separated titanium dioxide at a temperature of from 110° to 120° C.
7. The process of claim 6 further comprising the steps of (d) repulping said dried titanium dioxide in a hydrochloric acid solution, (e) separating the repulped titanium dioxide, (f) washing said separated, repulped titanium dioxide with water, and (i) drying said washed titanium dioxide.

* * * * *